United States Patent
Wan et al.

(10) Patent No.: US 11,983,481 B2
(45) Date of Patent: May 14, 2024

(54) SOFTWARE-DEFINED WAFER-LEVEL SWITCHING SYSTEM DESIGN METHOD AND APPARATUS

(71) Applicant: ZHEJIANG LAB, Hangzhou (CN)

(72) Inventors: Zhiquan Wan, Hangzhou (CN); Shunbin Li, Hangzhou (CN); Ruyun Zhang, Hangzhou (CN); Weihao Wang, Hangzhou (CN); Qingwen Deng, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/351,464

(22) Filed: Jul. 12, 2023

(65) Prior Publication Data
US 2024/0020455 A1  Jan. 18, 2024

(30) Foreign Application Priority Data
Jul. 13, 2022  (CN) .......................... 202210817940.4

(51) Int. Cl.
*G06F 30/398* (2020.01)
*G06F 30/392* (2020.01)
*G06F 117/12* (2020.01)

(52) U.S. Cl.
CPC .......... *G06F 30/398* (2020.01); *G06F 30/392* (2020.01); *G06F 2117/12* (2020.01)

(58) Field of Classification Search
CPC ...... G03F 9/7076; G03F 9/7084; G06F 30/39; G06F 13/107; G06F 13/4282; G06F 21/56; G06F 21/82; G06F 2213/0008; G06F 2213/0024; G06F 2213/0028; G06F 2213/0032; G06F 2213/0036; G06F 2213/0042; G06F 9/45504; G06F 12/0646; G06F 12/0802; G06F 12/0871; G06F 12/1458; G06F 13/1657; G06F 13/1668; G06F 15/786; G06F 2212/1056;
(Continued)

(56) References Cited

U.S. PATENT DOCUMENTS 5,664,254 A     9/1997  Ohkura et al.
2017/0270233 A1* 9/2017 Hook .................... G06F 30/398
(Continued)

FOREIGN PATENT DOCUMENTS

CN     104883224 A     9/2015
CN     106850462 A     6/2017
(Continued)

*Primary Examiner* — Binh C Tat
(74) *Attorney, Agent, or Firm* — McCoy Russell LLP (57) ABSTRACT

The present disclosure relates to software-defined methods and apparatuses for designing a wafer-level switching system, including: determining wafer-level switching system layout constraints; constructing a target wafer-level switching system and determining parameters, and designing a logical topology of a switching network; designing a layout of the switching chiplets on the wafer substrate; respectively designing interface structures of external chiplets and internal chiplets; configuring a switching mode and an enable state of each port of the switching chiplets; ending the process when the target logical topology can be achieved by the wafer-level switching system; otherwise, reconstructing a logical topology of a switching network and mapping it to the substrate.

10 Claims, 5 Drawing Sheets

(58) Field of Classification Search
CPC ......... G06F 2212/60; G06F 2212/7202; G06F 30/392; G06F 16/22; G06F 2117/12; G06F 30/398; H01L 27/1203; H01L 21/84; H01L 27/0207; H01L 27/1266; H01L 21/743; H01L 23/544; H01L 2224/81005; H01L 2221/68381; H01L 21/8252; H01L 27/14643; H01L 23/5386; H01L 2924/15311; H01L 29/66484; H01L 2224/49176; H01L 27/0688
USPC .................................................. 716/110–118
See application file for complete search history.

(56) References Cited

U.S. PATENT DOCUMENTS

| | | | |
|---|---|---|---|
| 2017/0277821 A1* | 9/2017 | Hook | G06F 30/392 |
| 2021/0049315 A1* | 2/2021 | Liao | H01L 24/20 |

FOREIGN PATENT DOCUMENTS

| | | | |
|---|---|---|---|
| CN | 110086709 A | 8/2019 | |
| CN | 112562767 A | 3/2021 | |
| CN | 112800715 A | 5/2021 | |
| CN | 113764399 A | 12/2021 | |
| TW | 202147060 A | 12/2021 | |

\* cited by examiner

SOFTWARE-DEFINED WAFER-LEVEL SWITCHING SYSTEM DESIGN METHOD AND APPARATUS

CROSS REFERENCE TO RELATED APPLICATION

This application claims priority to Chinese Patent Application No. 202210817940.4 filed on Jul. 13, 2022, the entire content of which is incorporated herein by reference.

TECHNICAL FIELD

The present disclosure relates to the field of integrated circuit technologies, and in particular, to software-defined wafer-level switching system design methods and apparatuses.

BACKGROUND

A network switching chip is a kind of network device that can be used for signal forwarding, which provides a path for any two access transceiver nodes. With the rapid expansion of data centers and the rapid development of supercomputers, there is an increasing demand for large-capacity switching chips. The existing large-capacity network switching chips include Tomahawk4 from Broadcom, Teralynx8 from Marvell, and Silicon One G100 from Cisco, all of which adopt 7 nm process and can provide switching capacity of 25.6 Tbps. However, with the development of integrated circuit technology, a physical limit of advanced process and a yield limit of large-scale integrated chips lead to a gradual failure of Moore's law, which limits a further improvement of the switching capacity of network switching chips.

In order to solve the performance bottleneck of a single chip, a wafer-level integration technology has become a research hotspot in the field of integrated circuits in the post-Moore era. The wafer-level integration technology uses a wafer substrate to replace the Printed Circuit Board (PCB), which improves the transmission rate and energy efficiency between chips by bonding unpackaged dies on the substrate, where the bonded die is also called a chiplet. Unlike a SoC (System on Chip), which can only be manufactured based on one process node, in a wafer-level integrated system, the bonded chiplets can be manufactured by different process nodes and have heterogeneous characteristics. By bonding multiple small area chiplets, performance expansion of the wafer-level integrated systems can be achieved, breaking existing design methods and computational paradigms of integrated circuits. Benefit from this, a large-scale wafer-level switching system is an effective methods to break through the bottleneck of switching capacity of data centers and supercomputers.

Due to constraints of mask area and mask consistency in wafer substrate processing, wafer substrate can only provide a same physical interconnection structure for bonded chiplets, which greatly limits the function and flexibility of wafer-level integrated system. For example, a wafer-level GPU (Graphics Processing Unit) system presented by Professor Subramanian S. Iyer of the University of California, Los Angeles, and a deep learning training system Dojo for autonomous driving introduced by Tesla Company all use a Mesh interconnection network to realize the interconnection and communication between chiplets. However, the Mesh interconnection network has situations of too many hops and serious congestion, so it may not be suitable for wafer-level switching systems. In addition, for different application scenarios, a wafer-level switching system should have the ability to realize multi-logical topology.

SUMMARY

The present disclosure relates to a software-defined method of designing a wafer-level switching system, the wafer-level switching system consists of a wafer substrate and switching chiplets bonded to the wafer substrate, and the switching chiplets including external chiplets and internal chiplets, the design method including:
  determining wafer-level switching system layout constraints;
  constructing a target wafer-level switching system, determining parameters of the target wafer-level switching system, and designing a logical topology of a switching network in combination with the wafer-level switching system layout constraints;
  mapping the logical topology of the switching network to the wafer substrate according to the wafer-level switching system layout constraints, and designing a layout of the switching chiplets on the wafer substrate based on a mapping situation;
  designing interface structures of the switching chiplets according to the logical topology of the switching network and the layout of the switching chiplets on the wafer substrate;
  configuring a switching mode and an enable state of each port of the switching chiplets according to the logical topology of the switching network to obtain the wafer-level switching system; and
  determining whether the wafer-level switching system realizes the logical topology of the switching network, and in response to determining that the logical topology of the switching network is realized, ending a process, in response to determining that the logical topology of the switching network is not realized, reconstructing a logical topology of a switching network and return to the designing the layout of the switching chiplets on the wafer substrate.

In some cases, the wafer-level switching system layout constraints include: an interconnection driving ability of the switching chiplets, the number of switching chiplets bonded to a substrate, an interconnection line length between the switching chiplets, a space between switching chiplets, a wafer substrate size and a switching chiplet size.

In some cases, the determining the wafer-level switching system layout constraints includes:
  selecting the wafer substrate and the switching chiplets, and acquire the wafer substrate size, the switching chiplet size and the interconnection driving ability of the switching chiplets;
  acquiring bonding process limit of the wafer substrate, and determining the space between switching chiplets in combination with the interconnection driving ability of the switching chiplets;
  calculating the number of the switching chiplets bonded to the substrate according to the wafer substrate size, the switching chiplet size and the space between switching chiplets; and
  determining the interconnection line length between the switching chiplets according to the interconnection driving ability of the switching chiplets.

In some cases, the designing the logical topology of the switching network includes:
  constructing the target wafer-level switching system, and determining external switching capacity, a hop count, a delay, and a bandwidth requirement of the target wafer-level switching system, and logical switching capacity of the external chiplet;

calculating a required number of the external chiplets according to the external switching capacity of the target wafer-level switching system and the logical switching capacity of the external chiplet;

calculating a number of the internal chiplets according to the number of the external chiplets and the number of the switching chiplets bonded to the substrate;

designing the logical topology of the switching network according to the hop count, the delay and the bandwidth requirement of the target wafer-level switching system, where the logical topology of the switching network includes a mesh topology, a ring topology, a tree topology and a hierarchical topology composed of a plurality of clusters; and designing dimensions of the logical topology of the switching network, a number of chiplets in each dimension, and a number of interconnection links between chiplets according to the number of the external chiplets and the number of the internal chiplets.

In some cases, the designing the layout of the switching chiplets on the wafer substrate includes: arranging the external chiplets at an edge of the wafer substrate, and locating the internal chiplets in a middle of the wafer substrate, where the internal chiplets include one or more interconnected chiplets and one or more internal switching chiplets, and each interconnected chiplet is located between an external switching chiplet and an internal switching chiplet.

In some cases, the internal chiplet further includes one or more intermediate chiplets, and each interconnected chiplet is located between an external chiplet and an intermediate chiplet, and between an intermediate chiplet and an internal switching chiplet.

In some cases, the designing the interface structures of the switching chiplets includes:

setting the interface structures at opposite sides of an external chiplet, where an interface of one side is connected with an external transceiver node, and an interface of the other side is configured to connect an internal chiplet; and setting the interface structures at four sides of an internal chiplet, where one interface is connected with an external chiplet or other internal chiplet, and the rest interfaces are interconnected with other internal chiplets.

In some cases, the obtaining the wafer-level switching system includes:

determining functions of each switching chiplet port according to the logical topology of the switching network and the layout of the switching chiplets on the wafer substrate, where the functions include realizing chiplets interconnection, realizing signal switching and not in use;

in response to determining that the port is configured to realize the chiplets interconnection, the enable state of the port is configured to enable, and the switching mode is configured to circuit switching; in response to determining that the port is configured to realize the signal switching, the enable state of the port is configured to enable, and the switching mode is configured to packet switching; and in response to determining that the port is not in use, the enable state of the switching chiplet port is configured to disable, and no switching mode is to be configured.

In some cases, the wafer-level switching system does not realize the logical topology of the switching network includes one or more of: an external switching bandwidth of the wafer-level switching system does not meet requirements, a number of functional switching chiplets does not match, and a connection bandwidth between switching chiplets does not meet requirements.

The present disclosure further relates to a software-defined apparatus for designing the wafer-level switching system, including a memory and one or more processors, where executable codes are stored in the memory, and when the executable codes are executed by the one or more processors, the above software-defined method of designing the wafer-level switching system is realized.

The present disclosure further discloses a non-transitory computer-readable storage medium, on which a program is stored, which, when executed by a processor, realizes a software-defined wafer-level switching system design method described above.

The features and advantages of the present disclosure will be explained in detail through embodiments combined with the accompanying drawings.

DETAILED DESCRIPTION

In order to make the purposes, technical solutions and advantages of the present disclosure clearer, the present disclosure will be further explained in detail through the accompanying drawings and examples. However, it should be understood that the specific embodiments described herein are only used to explain the present disclosure, and are not used to limit the scope of the present disclosure. Furthermore, in the following description, descriptions of well-known structures and technologies are omitted to avoid unnecessarily confusing the concepts of the present disclosure.

The beneficial effects of the present disclosure are as follows.

1. Based on a specific physical topology of a wafer substrate, the present disclosure can configure switching modes of different switching chiplet ports through a software-defined method, thus realizing multi-type and multi-level logical topologies of the wafer-level switching network and improving the flexibility of the wafer-level switching system.
2. The present disclosure lightens restrictions on the lengths of interconnection lines and the number of metal line layers due to the constraints of wafer substrate processing technology, and can realize wafer-level switching networks of different scales, thus improving the scale expansion capability and switching capacity of the wafer-level switching system.
3. By configuring specific switching chiplet ports to work in a circuit switching mode, a transmission delay introduced by a switching chiplet packet switching mode is reduced, and the performance of the wafer-level switching system is improved.

Figure 3:
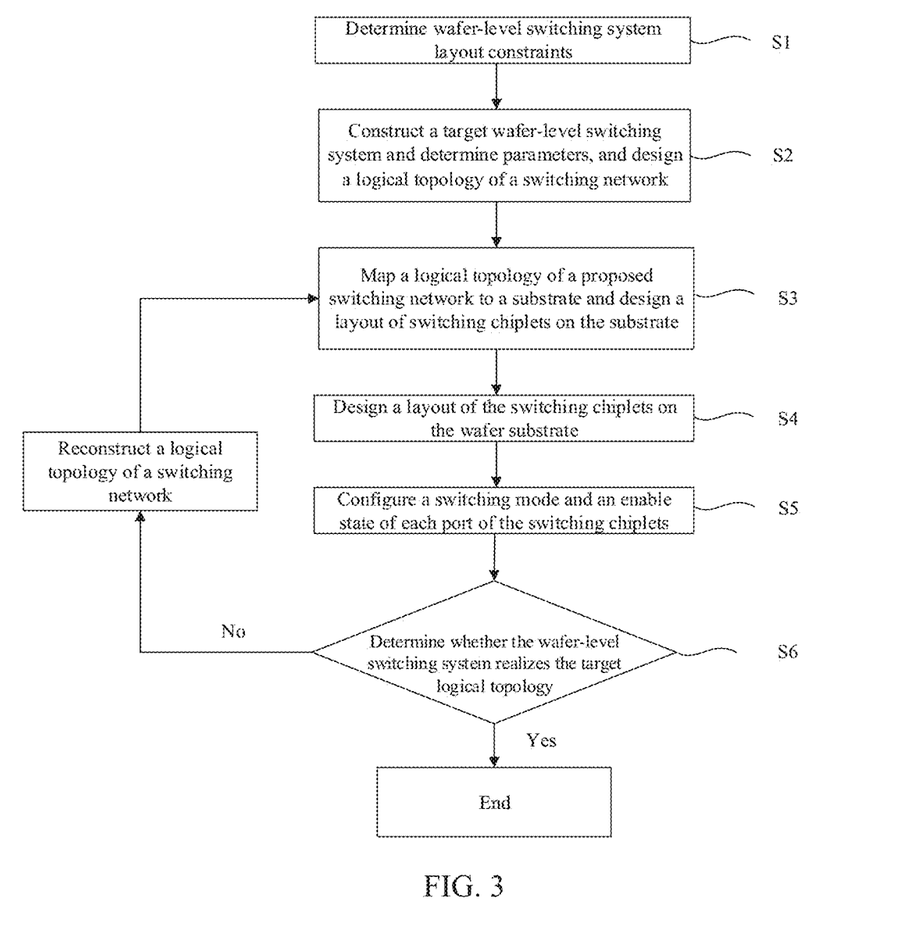
FIG. 3 is a flowchart of a software-defined wafer-level switching system design method according to an embodiment of the present disclosure.

The present disclosure relates to a software-defined method of designing a wafer-level switching system, where the wafer-level switching system contains a wafer substrate and switching chiplets bonded to the wafer substrate, and the switching chiplets include external chiplets and internal chiplets. As shown in FIG. 3, the design method includes the following steps:

S1, wafer-level switching system layout constraints are determined;

S2, a target wafer-level switching system is constructed, parameters of the target wafer-level switching system are determined, and a logical topology of a switching network is designed in combination with the wafer-level switching system layout constraints;

S3, the logical topology of the switching network in S2 is mapped to the wafer substrate according to the wafer-level switching system layout constraints, and a layout of the switching chiplets on the wafer substrate is designed based on a mapping situation;

S4, interface structures of the switching chiplets are designed according to the logical topology of the switching network in S2 and the layout of the switching chiplets on the wafer substrate in S3;

S5, a switching mode and an enable state of each port of the switching chiplets are configured according to the logical topology of the switching network in S2 to obtain the wafer-level switching system; and S6, whether the wafer-level switching system realizes the logical topology of the switching network in S2 is determined, if so, the process is ended; otherwise, a logical topology of a switching network is reconstructed and return to S3.

In a feasible embodiment, the wafer-level switching system layout constraints include: an interconnection driving ability of the switching chiplets, the number of switching chiplets that can be bonded to a substrate, an interconnection line length between the switching chiplets, a space between switching chiplets, a wafer substrate size and a switching chiplet size.

In a feasible embodiment, step S1 specifically includes the following sub-steps:

the wafer substrate and the switching chiplets are selected, and the wafer substrate size, the switching chiplet size and the interconnection driving ability of the switching chiplets are acquired;

bonding process limit of the wafer substrate is acquired, and the space between switching chiplets is determined in combination with the interconnection driving ability of the switching chiplets;

the number of the switching chiplets that can be bonded to the substrate is calculated according to the wafer substrate size, the switching chiplet size and the space between switching chiplets; and the interconnection line length between the switching chiplets is determined according to the interconnection driving ability of the switching chiplets.

In a feasible embodiment, step S2 specifically includes the following sub-steps:

the target wafer-level switching system is constructed, and external switching capacity, a hop count, a delay, and a bandwidth requirement of the target wafer-level switching system, and logical switching capacity of the external chiplet are determined;

the required number of the external chiplets is calculated according to the external switching capacity of the target wafer-level switching system and the logical switching capacity of the external chiplet;

the number of the internal chiplets is calculated according to the number of the external chiplets and the number of the switching chiplets that can be bonded to the substrate;

the logical topology of the switching network is designed according to the hop count, the delay and the bandwidth requirement of the target wafer-level switching system, where the logical topology of the switching network includes a mesh topology, a ring topology, a tree topology and a hierarchical topology composed of a plurality of clusters; and dimensions of the logical topology of the switching network, a number of chiplets in each dimension, and the number of interconnection links between chiplets are designed according to the number of the external chiplets and the number of the internal chiplets.

In a feasible embodiment, the interconnection driving ability of the switching chiplets is determined by an input/output physical layer (I/O PHY) inside the switching chiplet, and this data is generally provided when a switching chiplet is used. The interconnection driving ability of the switching chiplets is generally a constant value.

In a feasible embodiment, assuming that the external switching capacity of the target wafer-level switching system is a first value and the logical switching capacity of one external chiplet is a second value, the required number of external chiplets should be an integer greater than or equal to the first value divided by the second value.

In a feasible embodiment, the number of internal chiplets can be calculated by subtracting the number of external chiplets from the number of the switching chiplets that can be bonded to the substrate.

In a feasible embodiment, a specific operation of designing the layout of the switching chiplets on the wafer substrate in step S3 is as follows: the external chiplets are arranged at an edge of the wafer substrate, and the internal chiplets are located in the middle of the wafer substrate, where the internal chiplets include one or more interconnected chiplets and one or more internal switching chiplets, and each interconnected chiplet is located between an external switching chiplet and an internal switching chiplet.

In a feasible embodiment, the internal chiplets may further include one or more intermediate chiplets, and each interconnected chiplet is located between an external chiplet and an intermediate chiplet, or between an intermediate chiplet and an internal switching chiplet.

In a feasible embodiment, designing the interface structures of the switching chiplets in step S4 specifically includes the following sub-steps:

the interface structures are set at opposite sides of an external chiplet, where an interface of one side is connected with an external transceiver node, and an interface of the other side is configured to connect an internal chiplet; and the interface structures are set at four sides of an internal chiplet, where one interface of each internal chiplet is connected with an external chiplet or other internal chiplet, and the rest interfaces are interconnected with other internal chiplets.

In a feasible embodiment, step S5 specifically includes the following sub-steps:

functions of each switching chiplet port are determined according to the logical topology of the switching network in S2 and the layout of the switching chiplets on the wafer substrate, where the functions include realizing chiplets interconnection, realizing signal switching and not in use;

if the port is configured to realize the chiplets interconnection, the enable state of the port is configured to enable, and the switching mode is configured to circuit switching;

if the port is configured to realize the signal switching, the enable state of the port is configured to enable, and the switching mode is configured to packet switching; and if the port is not in use, the enable state of the switching chiplet port is configured to disable, and no switching mode needs to be configured.

In a feasible embodiment, the situation that the wafer-level switching system in S6 cannot realize the logical topology of the switching network includes that an external switching bandwidth of the wafer-level switching system does not meet external switching capacity requirements of the target wafer-level switching system, the number of functional switching chiplets does not match, and a connection bandwidth between switching chiplets does not meet the requirements.

Figure 8:
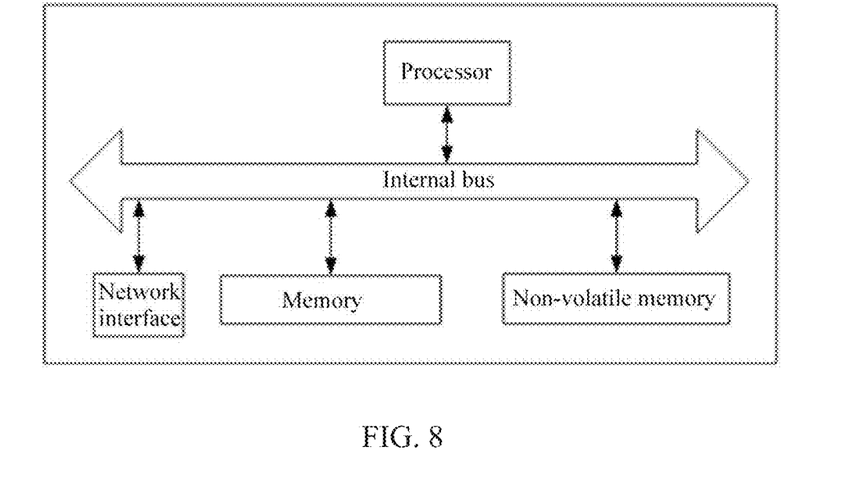
FIG. 8 is a schematic structural diagram of a software-defined wafer-level switching system design apparatus according to an embodiment of the present disclosure.

Embodiments of a software-defined wafer-level switching system design apparatus in the present disclosure can be applied to any device with data processing capability, which can be a device or apparatus such as a computer. Apparatus embodiments can be realized by software, or by hardware or a combination of hardware and software. Taking realized by software as an example, as an apparatus in the logical sense, is formed by reading corresponding computer program instructions from non-volatile memory into memory and running them through the processor of any device with data processing capability in which it is located. From a hardware level, as shown in FIG. 8, it is a hardware structure diagram of any device with data processing capability where a software-defined wafer-level switching system design apparatus of the present disclosure is located. In addition to the processor, memory, network interface and non-volatile memory shown in FIG. 8, any device with data processing capability where the apparatus is located in the embodiment usually includes other hardware according to the actual functions of the any device with data processing capability, which will not be described here again. The process of realizing the functions and roles of each unit in the above apparatus is detailed in the process of realizing the corresponding steps in the above method and will not be repeated here.

For the apparatus embodiments, because they basically correspond to the method embodiments, it is only necessary to refer to the method embodiments for the relevant part of the description. The apparatus embodiments described above are only schematic, in which the units described as separate components may or may not be physically separated, and the components displayed as units may or may not be physical units, that is, they may be located in one place or distributed to multiple network units. Some or all of the modules can be selected according to actual needs to achieve the purpose of the solution of the present disclosure. It can be understood and implemented by a person of ordinary skill in the art without creative labor.

Embodiments of the present disclosure further provides a non-transitory computer-readable storage medium, on which a program is stored, which, when executed by a processor, realizes a software-defined wafer-level switching system design method in the above embodiments.

The non-transitory computer-readable storage medium can be an internal storage unit of any device with data processing capability described in any of the previous embodiments, such as a hard disk or a memory. The computer-readable storage medium can also be an external storage device of any device with data processing capability, such as a plug-in hard disk, smart media card (SMC), SD card, flash card, etc. provided on the device. Further, the computer-readable storage medium can further include both internal storage units and external storage devices of any device with data processing capability. The computer-readable storage medium is configured to store the computer program and other programs and data required by any equipment with data processing capability, and can further be configured to temporarily store data that has been output or will be output.

Embodiments

Figure 1:
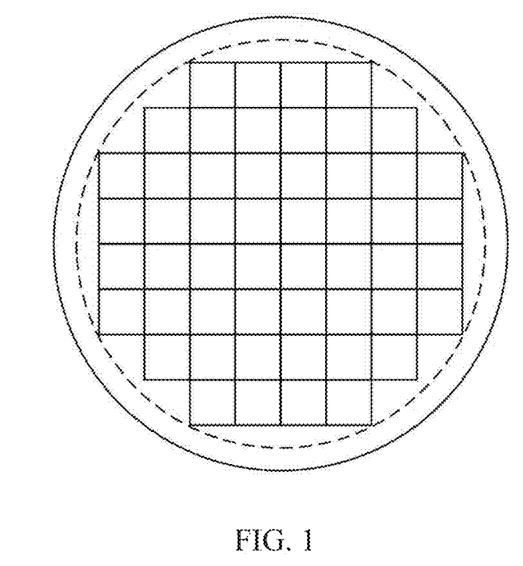
FIG. 1 is a layout constraint diagram of a 4-inch wafer-level switching system according to an embodiment of the present disclosure.

FIG. 1 shows a wafer-level switching system layout constraint according to an embodiment of the present disclosure, in which a circle represents a wafer substrate and a square is a switching chiplet bonded on it. A diameter of the wafer substrate is 4 inches (101.6 mm). Considering potential manufacturing process defects of the wafer substrate, a portion of the substrate edge (such as 5 mm) can be reserved without layout, and the layout area can be a dashed circle area in FIG. 1. The size of a switching chiplet is a square with a side length of 10 mm, and a bonding interval between chiplets is 100 um. According to the above layout restrictions, the number of switching chiplets bonded to the wafer substrate is 52. The wafer substrate provides a mesh interconnection physical topology for the switching chiplet in consideration of the limitation of the interconnection driving ability of the chiplets, that is, the switching chiplet is only interconnected with one or more adjacent chiplets.

Figure 2:
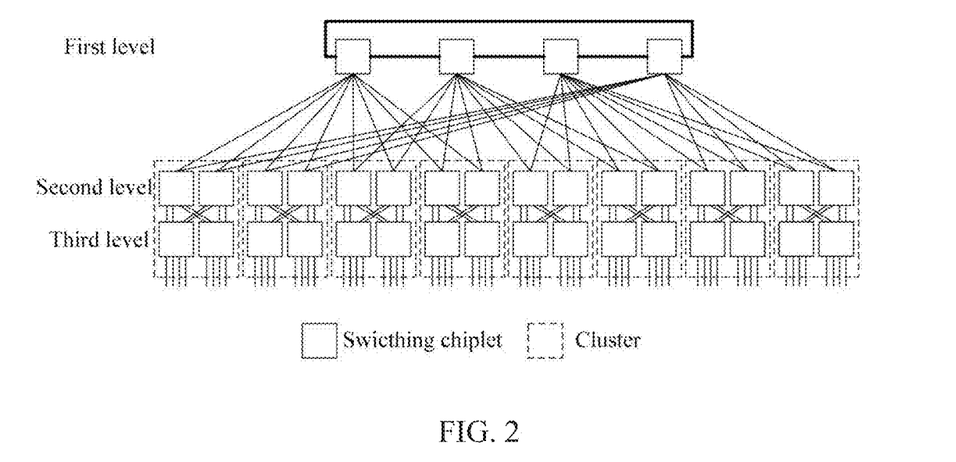
FIG. 2 is a logical topology diagram of a hierarchical switching network according to an embodiment of the present disclosure.

Based on the wafer-level switching system layout constraints, for example, the embodiment of the present disclosure plans to build a wafer-level switching system with external switching capacity of 12.8 Tbps, and plans to use external chiplets with logical switching capacity of 1.6 Tbps and internal chiplets with logical switching capacity of 3.2 Tbps. Based on the wafer-level switching system, the embodiment of the present disclosure plans to realize a hierarchical switching network topology as shown in FIG. 2. The hierarchical topology is a three-level (three dimensions) structure. The first level includes four switching chiplets to form a ring topology, and a bandwidth of interconnection lines between the first-level chiplets is 800 Gbps. The second level and the third level respectively contain 16 switching chiplets, where the switching chiplets of the second level and the third level form a cluster. The bandwidth of the interconnection line between the second-level chiplets and the third-level chiplets in a cluster is 200 Gbps, which forms eight clusters, and the external switching capacity of each cluster is 1.6 Tbps. The switching chiplets of the first level and the second level form a tree topology, in which each chiplet of the first level is connected with eight chiplets of the second level, one chiplet of the second level is connected with two chiplets of the first level, and the bandwidth of the interconnection line between one chiplet of the first level and one chiplet of the second level is 200 Gbps, that is, the internal switching capacity of the wafer-level switching system is 6.4 Tbps.

Figure 4:
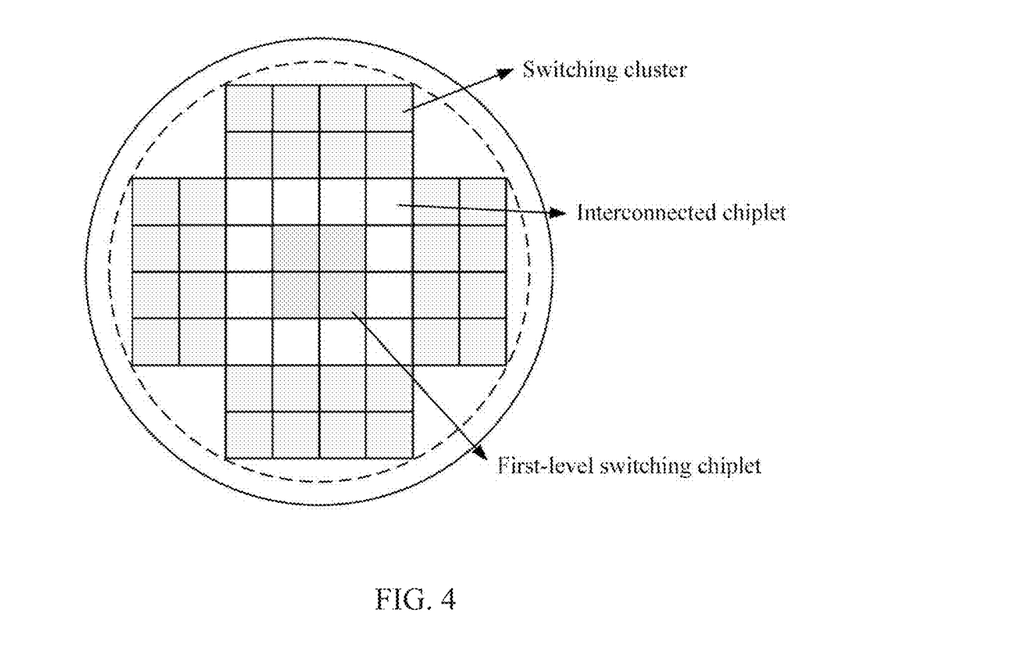
FIG. 4 is a layout diagram of a wafer-level switching system according to an embodiment of the present disclosure.

Corresponding to the above-mentioned wafer-level switching system, the embodiment of the present disclosure, as shown in FIG. 3, provides a method of designing wafer-level switching system based on software-defined hybrid switching mechanism, in which the wafer-level switching system layout constraint in step S1 can refer to FIG. 1; and the logical topology of the wafer-level switching network in step S2 can refer to FIG. 2. According to the wafer-level switching system layout constraint and the logical topology of switching network, the layout diagram of wafer-level switching system as shown in FIG. 4 can be designed. The four first-level switching chiplets in the logical topology of the switching network are located in the center of the layout diagram. The eight switching clusters in the logical topology of the switching network are located at the edge of the layout diagram. The tree topology formed by the first-level and second-level switching chiplets in the logical topology of the switching network is assisted by interconnected chiplets in the layout diagram.

Figures 5A, 5B:
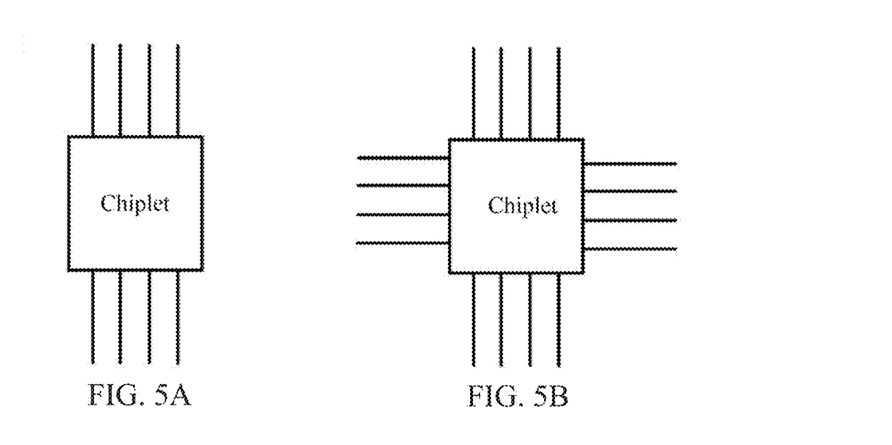
FIGS. 5A-5B is a structural diagram of interfaces of an external chiplet and an internal chiplet according to an embodiment of the present disclosure.

After the layout of wafer-level switching system is completed, designed interface structures of an external chiplet and an internal chiplet are shown in FIGS. 5A-5B. The interface structure of an external chiplet is shown in FIG. 5A, which contains 4 ports on each opposite side of the external chiplet. Each port has a data rate of 200 Gbps, and the switching capacity of the external chiplet is 1.6 Tbps. The interface structure of an internal chiplet is shown in FIG. 5B, which contains 4 ports on each of the four sides. Each port has a data rate of 200 Gbps, and the switching capacity of the internal chiplet is 3.2 Tbps.

The internal chiplets include first-level switching chiplets and second-level switching chiplets, while the external chiplets include third-level chiplets.

Figure 6A:
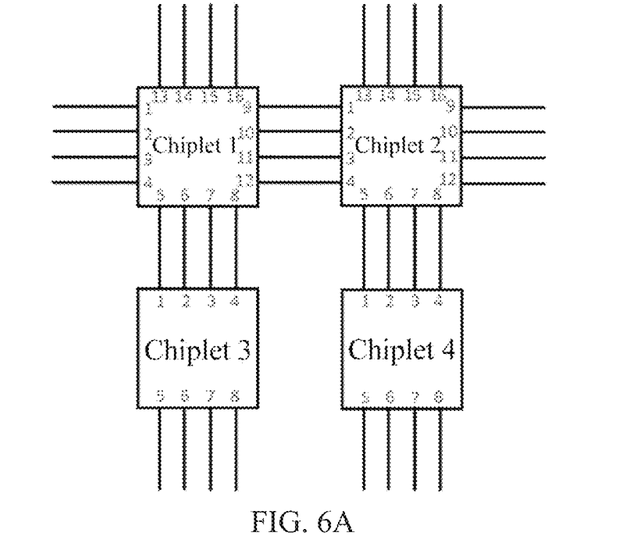
FIGS. 6A-6C is a diagram of a hierarchical switching network cluster structure based on a hybrid switching mechanism according to an embodiment of the present disclosure.
Figure 6B:
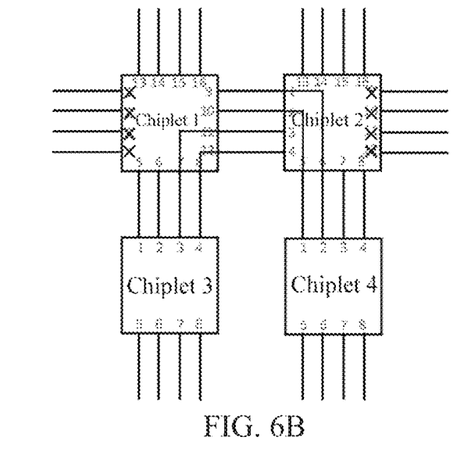
Figure 6C:
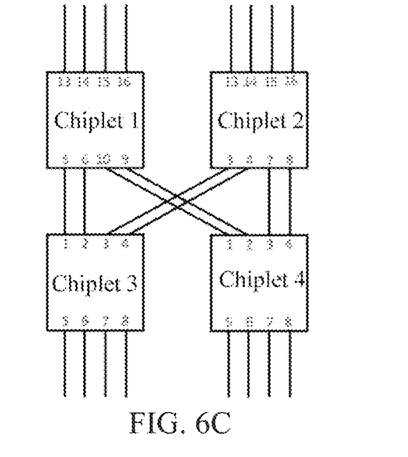

A cluster construction flow in the logical topology of the hierarchical switching network is shown in FIGS. 6A-6C. Physical interconnection method of each port of the four chiplets is shown in FIG. 6A, where chiplet 1 and chiplet 2 are internal chiplets, and chiplet 3 and chiplet 4 are external chiplets. In order to realize the cluster structure in the hierarchical logical topology, switching mechanism configurations and enabling states of each port is shown in FIG. 6B. Port 8 and port 12, port 7 and port 11 of chiplet 1 are configured as circuit interconnections (circuit switching) inside the chiplet, and port 2 and port 5, port 1 and port 6 of chiplet 2 are configured as circuit interconnections inside the chiplet. Ports 1-4 of chiplet 1 and ports 9-12 of chiplet 2 are configured to a disable state, that is, a cross sign in the figure. Except for the above ports, all other ports are configured in packet switching mode. Since a processing time of circuit switching is much faster than that of packet switching, a logic interconnection mode shown in FIG. 6C can be realized under the configuration of the above-mentioned hybrid switching mode and enabling state, that is, the cross interconnection structures of chiplet 1 with chiplet 4, and chiplet 2 with chiplet 3 can be realized by configuring the switching mode and enabling state of each port of the switching chiplets, thus satisfying the cluster structure.

Figure 7:
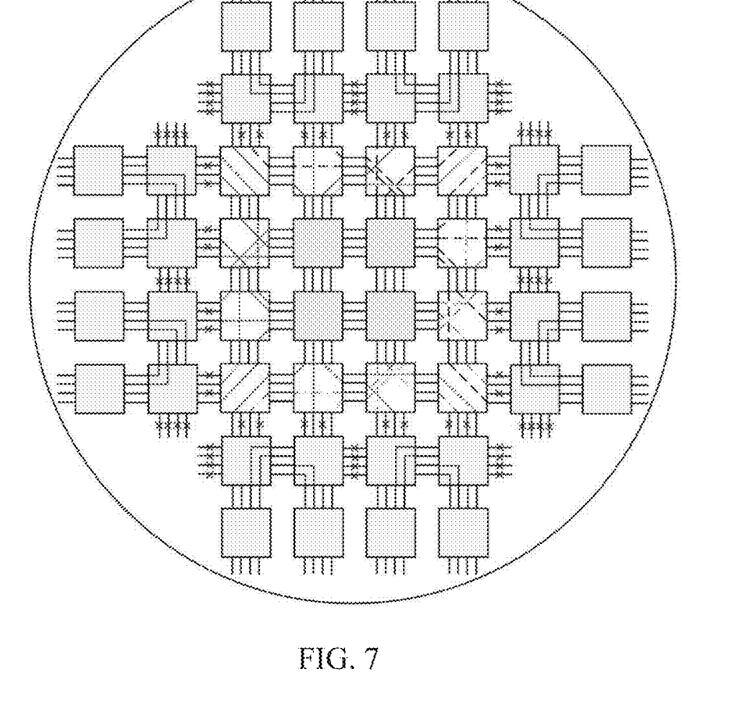
FIG. 7 is a port configuration diagram of a hierarchical wafer-level switching network according to an embodiment of the present disclosure.

After completing the cluster construction in the hierarchical switching network, the port switching mode and enabling state of the remaining switching chiplets can be further configured according to the above process, and the port configurations of 48 chiplets as shown in FIG. 7 can be obtained. The interconnection lines inside the chiplets indicate that the corresponding ports are configured in the circuit switching mode, the cross of the interconnection lines between the chiplets indicates that the corresponding ports are disabled, and the ports without other marks indicate that they are configured in the packet switching mode. Based on the chiplet port configuration in FIG. 7, the hierarchical switching network logical topology as shown in FIG. 2 can be realized.

The software-defined wafer-level switching system design method provided by the present disclosure aims at an existing wafer substrate with multiple process constraints and fixed physical topology. By using the software defined method, a multi-type and multi-level logical topology of the wafer-level switching network is realized and the flexibility of the wafer-level switching system is improved.

The above is only preferred embodiments of the present disclosure, and it is not used to limit the present disclosure. Any modification, equivalent substitution or improvement made within the spirit and principle of the present disclosure should be included in the protection scope of the present disclosure.

The invention claimed is:

1. A software-defined method of designing a wafer-level switching system, the wafer-level switching system containing a wafer substrate and switching chiplets bonded to the wafer substrate, and the switching chiplets comprising external chiplets and internal chiplets, the method comprising:
    determining wafer-level switching system layout constraints;
    constructing a target wafer-level switching system, determining parameters of the target wafer-level switching system, and designing a logical topology of a switching network in combination with the wafer-level switching system layout constraints;
    mapping the logical topology of the switching network to the wafer substrate according to the wafer-level switching system layout constraints, and designing a layout of the switching chiplets on the wafer substrate based on a mapping situation;
    designing interface structures of the switching chiplets according to the logical topology of the switching network and the layout of the switching chiplets on the wafer substrate;
    configuring a switching mode and an enable state of each port of the switching chiplets according to the logical topology of the switching network to obtain the wafer-level switching system; and
    determining whether the wafer-level switching system realizes the logical topology of the switching network, and in response to determining that the logical topology of the switching network is realized, ending a process, in response to determining that the logical topology of the switching network is not realized, reconstructing a logical topology of a switching network and return to the designing the layout of the switching chiplets on the wafer substrate;

wherein the obtaining the wafer-level switching system comprises:
  determining functions of each switching chiplet port according to the logical topology of the switching network and the layout of the switching chiplets on the wafer substrate, wherein the functions comprise realizing chiplets interconnection, realizing signal switching and not in use;
  in response to determining that the port is configured to realize the chiplets interconnection, the enable state of the port is configured to enable, and the switching mode is configured to circuit switching;
  in response to determining that the port is configured to realize the signal switching, the enable state of the port is configured to enable, and the switching mode is configured to packet switching; and
  in response to determining that the port is not in use, the enable state of the switching chiplet port is configured to disable, and no switching mode is to be configured.

2. The software-defined method of designing the wafer-level switching system according to claim 1, wherein the wafer-level switching system layout constraints comprise:
  an interconnection driving ability of the switching chiplets,
  a number of switching chiplets bonded to a substrate,
  an interconnection line length between the switching chiplets,
  a space between switching chiplets,
  a wafer substrate size and
  a switching chiplet size.

3. The software-defined method of designing the wafer-level switching system according to claim 2, wherein the determining the wafer-level switching system layout constraints comprises:
  selecting the wafer substrate and the switching chiplets, and acquire the wafer substrate size, the switching chiplet size and the interconnection driving ability of the switching chiplets;
  acquiring bonding process limit of the wafer substrate, and determining the space between switching chiplets in combination with the interconnection driving ability of the switching chiplets;
  calculating the number of the switching chiplets bonded to the substrate according to the wafer substrate size, the switching chiplets size and the space between switching chiplets; and
  determining the interconnection line length between the switching chiplets according to the interconnection driving ability of the switching chiplets.

4. The software-defined method of designing the wafer-level switching system according to claim 3, wherein the designing the logical topology of the switching network comprises:
  constructing the target wafer-level switching system, and determining external switching capacity, a hop count, a delay, and a bandwidth requirement of the target wafer-level switching system, and logical switching capacity of the external chiplet;
  calculating a required number of the external chiplets according to the external switching capacity of the target wafer-level switching system and the logical switching capacity of the external chiplet;
  calculating a number of the internal chiplets according to the number of the external chiplets and the number of the switching chiplets bonded to the substrate;
  designing the logical topology of the switching network according to the hop count, the delay and the bandwidth requirement of the target wafer-level switching system, wherein the logical topology of the switching network comprises a mesh topology, a ring topology, a tree topology and a hierarchical topology composed of a plurality of clusters; and
  designing dimensions of the logical topology of the switching network, a number of chiplets in each dimension, and a number of interconnection links between chiplets according to the number of the external chiplets and the number of the internal chiplets.

5. The software-defined method of designing the wafer-level switching system according to claim 1, wherein the designing the layout of the switching chiplets on the wafer substrate comprises:
  arranging the external chiplets at an edge of the wafer substrate, and locating the internal chiplets in a middle of the wafer substrate, wherein the internal chiplets comprise one or more interconnected chiplets and one or more internal switching chiplets, and each interconnected chiplet is located between an external switching chiplet and an internal switching chiplet.

6. The software-defined method of designing the wafer-level switching system according to claim 5, wherein the internal chiplet further comprises one or more intermediate chiplets, and each interconnected chiplet is located between an external chiplet and an intermediate chiplet, or located between an intermediate chiplet and an internal switching chiplet.

7. The software-defined method of designing the wafer-level switching system according to claim 1, wherein the designing the interface structures of the switching chiplets comprises:
  setting the interface structures at opposite sides of an external chiplet, wherein an interface of one side is connected with an external transceiver node, and an interface of the other side is configured to connect an internal chiplet; and
  setting the interface structures at four sides of an internal chiplet, wherein one interface is connected with an external chiplet or other internal chiplet, and the rest interfaces are interconnected with other internal chiplets.

8. The software-defined method of designing the wafer-level switching system according to claim 1, wherein the wafer-level switching system does not realize the logical topology of the switching network comprises one or more of:
  an external switching bandwidth of the wafer-level switching system does not meet requirements,
  a number of functional switching chiplets does not match, and
  a connection bandwidth between switching chiplets does not meet requirements.

9. A software-defined apparatus for designing the wafer-level switching system, comprising a memory and one or more processors, wherein executable codes are stored in the memory, and when the executable codes are executed by the one or more processors, the software-defined method of designing the wafer-level switching system according to claim 1 is realized.

10. A non-transitory computer-readable storage medium, wherein a program is stored thereon, and when the program is executed by a processor, the software-defined method of designing the wafer-level switching system according to claim 1 is realized.

\* \* \* \* \*